May 28, 1968 W. R. SMITH-VANIZ 3,386,018

TAPE TRANSPORTS INCLUDING ZERO BEAT RESPONSE IN STEPPING MOTOR SYSTEMS

Filed Aug. 18, 1964 6 Sheets-Sheet 1

INVENTOR.
William Reid Smith-Vaniz
BY
Blair & Buckles
ATTORNEYS.

INVENTOR.
William Reid Smith-Vaniz
BY
Blair & Buckles
ATTORNEYS.

INVENTOR.
William Reid Smith-Vaniz
BY
Blair & Buckles
ATTORNEYS.

May 28, 1968 W. R. SMITH-VANIZ 3,386,018

TAPE TRANSPORTS INCLUDING ZERO BEAT RESPONSE IN STEPPING MOTOR SYSTEMS

Filed Aug. 18, 1964 6 Sheets-Sheet 4

INVENTOR.

William Reid Smith-Vaniz

BY

Blair & Buckles

ATTORNEYS.

May 28, 1968 W. R. SMITH-VANIZ 3,386,018

TAPE TRANSPORTS INCLUDING ZERO BEAT RESPONSE IN STEPPING MOTOR SYSTEMS

Filed Aug. 18, 1964 6 Sheets-Sheet 5

INVENTOR.
William Reid Smith-Vaniz

BY

Blair & Buckles
ATTORNEYS.

REVERSE FIG. 8.
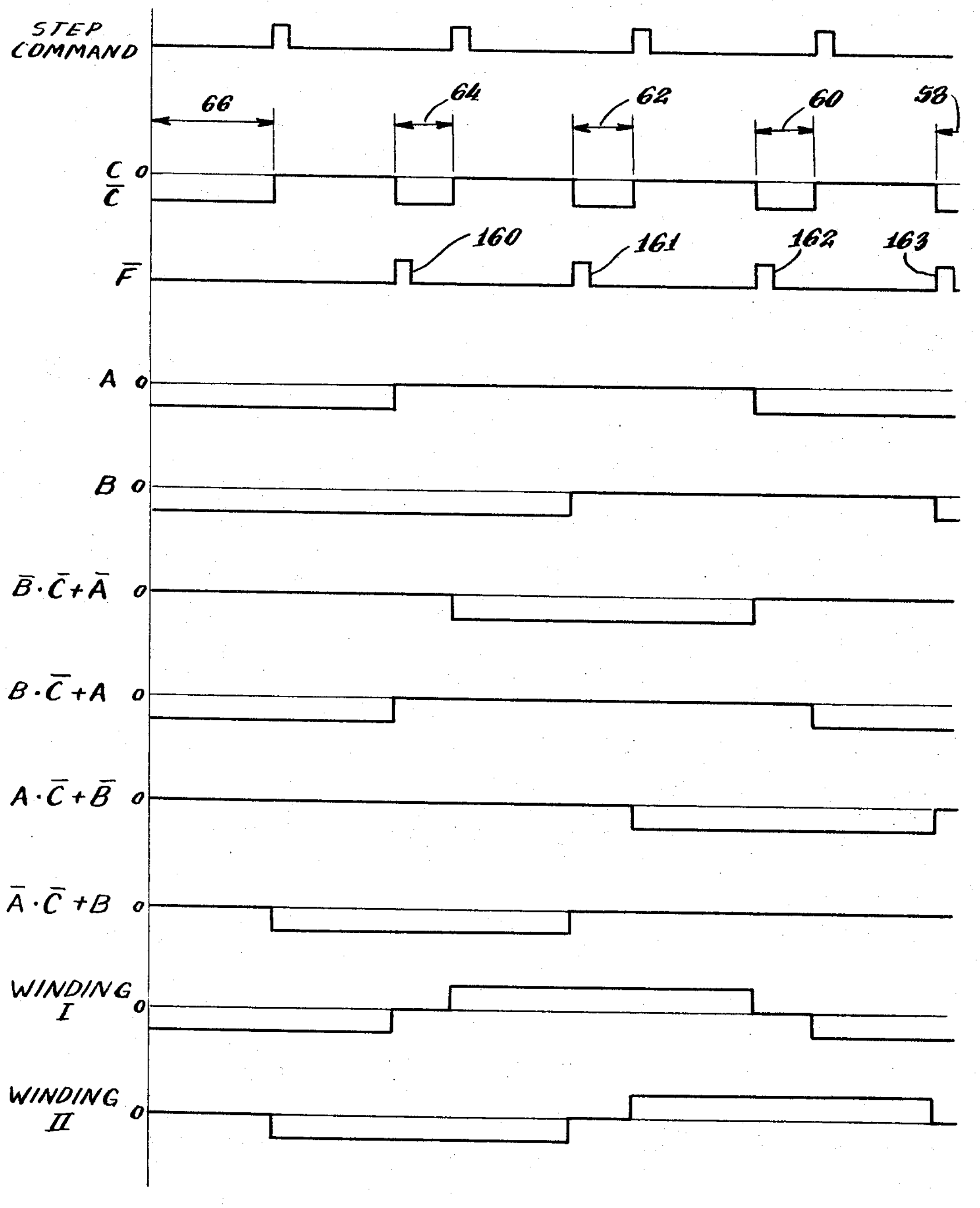
INVENTOR.
William Reid Smith-Vaniz
BY
Blair & Buckles
ATTORNEYS.

United States Patent Office 3,386,018
Patented May 28, 1968

3,386,018

TAPE TRANSPORTS INCLUDING ZERO BEAT RESPONSE IN STEPPING MOTOR SYSTEMS

William Reid Smith-Vaniz, Darien, Conn., assignor to Wiltek, Inc., a corporation of Connecticut Continuation-in-part of application Ser. No. 352,909, Mar. 18, 1964. This application Aug. 18, 1964, Ser. No. 390,333
18 Claims. (Cl. 318—138)

ABSTRACT OF THE DISCLOSURE

The tape transport includes a motor driving a sprocket which engages sprocketed magnetic tape. A drive circuit energizes polyphase windings to selectively establish a series of magnetic detent positions attracting a permanent magnet rotor. Step commands condition the drive circuit to establish an adjacent detent position to which the rotor is attracted. The rotor overshoots and comes to the next adjacent detent position with zero velocity. The next adjacent detent position is then automatically established to hold the rotor thereat, thereby incrementing the tape without oscillation.

Recently there have been developed incremental magnetic tape recorder-reproducers capable of recording characters arriving at random rates at uniformly spaced locations on a magnetic tape and reading out prerecorded characters at random "command" rates. One such recorder-reproducer is disclosed and claimed in my copending application for "Information Storage and Retrieval Systems," Ser. No. 352,909, filed Mar. 18, 1964. Said application is incorporated herein by reference and this application is a continuation-in-part of said application. As disclosed in my copending application, the recorder-reproducer operates in response to a "motor strobe pulse" to energize an electrical stepping motor so as to step the magnetic tape through a single increment of tape translation. The recording operation is coordinated with the translation of the magnetic tape during each step increment, so as to record each information character at predetermined locations on the magnetic tape.

To read out prerecorded information, the recorder-reproducer responds to a motor strobe pulse to step the magnetic tape through a step equal in length to the step imparted to the magnetic tape during a recording operation. The readout operation is similarly coordinated with each step of the magnetic tape to sense the information characters previously recorded at the predetermined locations on the tape. Thus, whether in the recording or the readout operating mode, the recorder-reproducer operates to step the magnetic tape only when there is information to be recorded or there is a request for the readout of a prerecorded character.

As discussed in my above-noted copending application, it is important that each tape step be uniform in length. Moreover, the velocity characteristics of the tape during each tape step should be consistently uniform in order that a record or readout operation can be readily coordinated with the tape translation during each step. Additionally, it is desirable that the tape be translated at a high velocity during each step so that each tape step may be completed in a short interval of time, thereby permitting more rapid tape stepping rates.

As the tape velocity during each step is increased there is a propensity for the tape drive mechanism, due to its inertia, to oscillate or "hunt" about each new indexed tape position before completely coming to rest at the conclusion of each tape step. Thus, the tape may still be moving, possibly in the opposite direction, when the tape is again stepped. As a consequence, the velocity characteristic of the tape during each tape step may vary widely, depending upon the motor strobe or step command rate. This adversary affects the recording or reproducing of information characters.

Elaborate provisions may be added to electrically or mechanically damp the stepping motor to eliminate, or at least reduce, these mechanical oscillations. However, as the degree of damping is increased, the maximum tape velocity developed by the motor during the period of each tape step is accordingly reduced, and more time is required to complete each step. Thus, the maximum stepping rate is a compromise with the degree of mechanical oscillation that can be tolerated. Of course, the ideal situation would be to completely eliminate these mechanical oscillations without severely reducing the motor stepping rate.

Heretofore, magnetic tape transports for incremental recorder-reproducers of the above-described character have not been readily reversible. The capability of rapidly reversing the direction of step-by-step tape translation while maintaining tape step uniformity offers many advantageous features. For example, when an erroneous information character has been recorded during a tape step in one direction, the tape can be back-stepped and the correct character can be recorded over the erroneous one. This double reversal of tape step direction should be accomplished rapidly so as not to materially interrupt the transmission of successive information characters to be recorded. Similarly, a reversible recorder-reproducer can be back-stepped to re-read information characters which are improperly received by the output requesting device. This capability has particular advantage in digital communication networks where the information characters are generated or received by teletypewriters.

In addition, a complete message can be recorded in reverse order and then read out in proper order without having to rewind the magnetic tape.

Apart from its specific application to tape transports, there are other applications for an actuator which, on command, steps in either direction to a new indexed position and remains there until another command is received. Such applications include, for example, machine tool and process control equipment for advancing or retracting the control rods in a nuclear reactor. Here, again, the problem of achieving rapid indexing or stepping rates without overshooting and oscillating about new index positions becomes quite serious.

It is accordingly an object of the present invention to provide a tape transport capable of imparting incremental stepping translation, on command, to a tape storage medium.

A further object is to provide a tape transport of the above character capable of stepping a tape storage medium at rapid step command rates, while maintaining each tape step substantially uniform in character.

An additional object is to provide a tape transport of the above character which is capable of stepping a tape storage medium in alternate directions.

It is a further object of the invention to provide a novel drive circuit for achieving uniform incremental stepping operation, on command, of an electrical actuator.

An additional object is to provide a method for driving an electrical actuator so as to achieve uniform incremental operation thereof.

An additional object is to provide an electrical actuator drive circuit of the above character capable of effecting incremental operation at rapid command rates.

A further object is to provide a method of the above character for energizing an electrical actuator so as to achieve incremental operation thereof at rapid command rates. A still further object is to provide a drive circuit of the above character capable of reversibly indexing an actuator while eliminating hunting.

A yet further object is to provide a circuit of the above character for a synchronous motor capable of effecting incremental output shaft rotation on command to successive indexed shaft positions.

An additional object is to provide a method for energizing a synchronous motor to produce incremental output shaft rotation, on command, to successive indexed shaft positions.

An additional object is to provide an electronic drive circuit of the above character capable of achieving controlled indexing of a motor output shaft on command, while eliminating motional oscillations of the output shaft.

A still further object is to provide a stepping motor drive circuit of the above character capable of effecting incremental stepping rotation of a motor output shaft in either direction.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which:

FIGURE 8 is a timing diagram showing the relationship of the various signals developed by the motor drive circuit of FIGURE 4 for stepping the motor of FIGURE 2 in the reverse direction.

Similar reference characters refer to similar elements throughout the several views of the drawings.

*General description*

Figures 1, 4:
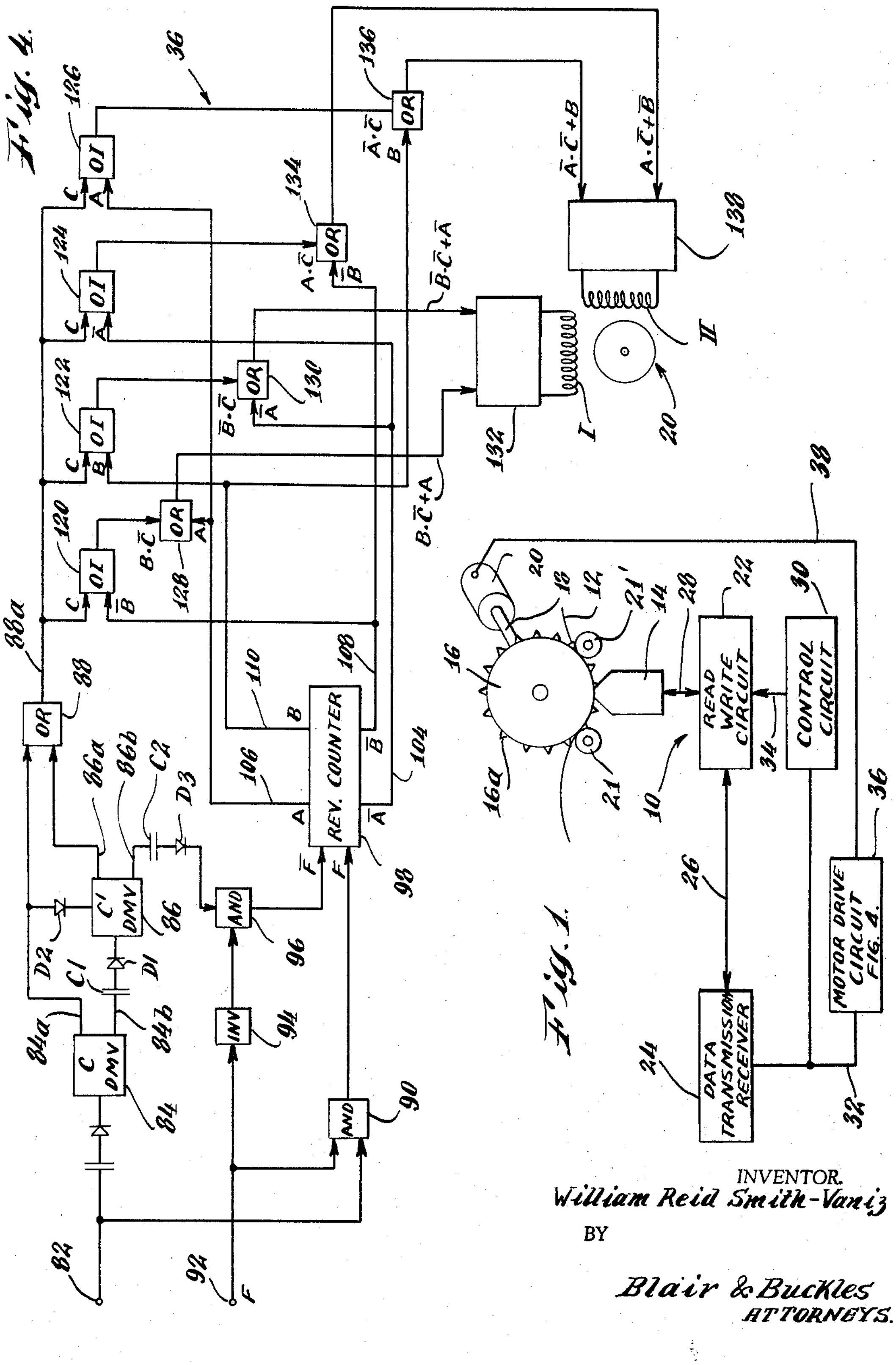
FIGURE 1 is a schematic diagram, partially in block form, of a preferred form of tape transport according to the present invention, as incorporated in an incremental magnetic tape recorder-reproducer.
FIGURE 4 is a logic block diagram, partially in schematic form, of the preferred motor drive circuit of the present invention.

Broadly stated, the present invention comprises a novel drive circuit adapted to provide, on command, incremental operation of an electromagnetic actuator. The actuator is of the type having a movable magnetic member magnetically associated with an array of selectively energizable magnetic poles to establish a series of alternating half-step and full step magnetic detent positions for the member. The detent positions being at the poles and at the magnetic midpoint between the poles A. The distance between detents being defined as a half-step.

The drive circuit, in response to a step command, operates to energize the array of magnetic poles of the actuator according to a first half-step command condition so as to cause the member to execute a half-step. The member, in seeking the next adjacent magnetic detent position, is accelerated until reaching maximum velocity at this detent position. The member overshoots this position and begins to decelerate until it arrives at the second next adjacent detent position with substantially zero velocity. Precisely at this moment, the drive circuit operates to energize the magnetic poles of the actuator according to a second half-step command condition such that the magnetic member is held at this second next adjacent magnetic detent position which constitutes a full step. Thus, motional oscillations of the member as it assumes this full step position are virtually eliminated. In response to each of a succession of step commands, this sequence of drive circuit operation is repeated and the actuator member is stepped to a corresponding succession of full step magnetic detent positions.

The drive circuit includes provision for selectively controlling the direction in which the member is stepped in execution of each step command. This direction control provision is capable of reversing the direction of stepping at any time after the member has completed a previous full step.

The invention further comprises a novel method for selectively energizing the magnetic poles of an actuator so as to achieve commanded incremental translation of an actuator member at rapid stepping rates while eliminating motional oscillations of the member as it executes each step command.

The invention also comprises a tape transport for use in an incremental recorder-reproducer. The tape transport incorporates the novel drive circuit to provide incremental operation of an actuator of the above character. The actuator member is drivingly connected to a tape engaging member. The tape transport than imparts incremental stepping translation on command to the storage tape each time the recorder-reproducer is called upon to record information on the tape or to read out pre-recorded information from the tape.

The tape transport, according to the invention, provides rapid tape stepping rates where each tape step is of uniform character so as to facilitate the necessary coordination between the recording-reproducing operations and the tape translation during each tape step.

Moreover the tape transport of the invention is reversible to provide the advantages of rapid tape back-stepping. The uniform character of each tape step, regardless of direction, is maintained so that recording-reproducing operations can be performed whether the tape is stepped in the forward or the reverse direction.

DETAILED DESCRIPTION

*Introduction*

As particularly disclosed in my above noted copending application Serial Number 352,909 and in the tape transport of the present invention generally indicated at 10 in FIGURE 1, a sprocketed magnetic tape 12 is driven past a magnetic head unit 14 by a drive sprocket 16. The drive sprocket 16 has a plurality of sprocket teeth *16a* engaging sprocket holes in the tape 12 and is mounted on the output shaft 18 of an incremental stepping motor 20. A pair of idler rollers 21, 21′ conform the tape 12 to the periphery of the sprocket 16 to maintain interengagement between the tape sprocket holes and the sprocket teeth *16a*. The location of the drive sprocket 16 immediately adjacent the magnetic head gaps of head unit 14, as disclosed in the copending application of John R. Montgomery for "Tape Transports," Serial No. 349,350 filed March 4, 1964, permits reversible operation of the recorder-reproducer. That is, the sprocket 16 may drive the tape in either direction as seen in FIGURE 1 while recording or reproducing operations are performed.

A plurality of individual heads of the magnetic head unit 14 are selectively and separately energized by a read-write circuit 22 to each record one channel of information arriving from a data transmitter 24 over data lines 26. This information takes the form of discrete binary information units or "bits." In practice the data transmitter 24 may correspond to a computer, a telemetry or other communication receiver. Binary coded information is fed to the read-write circuit 22 over a plurality of data lines 26 on a parallel bit basis or on a serial bit basis over a single data line 26. Each of the individual magnetic heads making up head unit 14 is connected to the read-write circuit 22 via a separate conductor of cable 28 to record binary information bits arriving on one of the data lines 26. Thus, the recording of each character of information is said to be on a parallel bit basis.

If on the other hand, the read-write circuit 22 is in the read mode and the apparatus indicated at block 24 is conditioned to receive pre-recorded data from the read-write circuit 22, the parallel bits of each character recorded on the tape 12 are then read out by the head unit 14 for transmission over data lines 26 to the receiver 24 on a parallel bit basis or one at a time "serially" over a single data line depending on the nature of the receiver.

As described in my above-noted copending application, Serial Number 352,909, to record or read out information, the tape 12 is swept past the magnetic head unit 14. The system is particularly adapted to record or read out characters asynchronously or randomly as dictated by the data transmitter or receiver 24. Accordingly, the tape 12 is translated only when there is a character to be recorded or there is a request for the output of a character.

As a write or read request, the receiver or transmitter 24 supplies a synchronizing clock pulse hereinafter termed "step command," to a control circuit 30 over conductor 32. When the unit 24 is a transmitter of digital information, the step command is generated simultaneously with the transmission of each character on data lines 26 to the read-write circuit 22.

The control circuit 30 operates in response to each step command to coordinate the operation of the read-write circuit 22 over a control cable 34. In addition, each step command is applied to a novel motor drive circuit 36, to be described, in detail below for systematic energization of the stepping motor 20 over cable 38. The motor 20 is a stepping motor preferably of the type having a permanent magnet rotor and polyphase field windings. The motor field windings are systematically energized with direct current to step the rotor through a series of equally and angularly spaced magnetic detents. One such stepping motor that takes 200 incremental steps to make one revolution is the SLO-SYN synchronous motor manufactured by The Superior Electric Company of Bristol, Conn. When using this motor, each step command results in the sprocket 16 being rotated through an angle of 1.8°.

The bits of each character coincident with each step command are temporarily stored in the circuit 22 during the initial period of each tape step and, as controlled by the control circuit 30 over control cable 34, are applied to the individual heads of the head unti 14 for recording on tape at the precise instant the tape is moving at its maximum velocity, as described in my above-noted copending application.

When the recorder-reproducer 10 of FIGURE 1 is operated as a magnetic tape playback unit or reader, through appropriate conditioning of the control circuit 30, the unit 24 (in this case a data receiver) requests characters by transmitting a step command to the control circuit 30. It will be appreciated that these requests may occur asynchronously or synchronously as dictated by the requirements of the data receiver 24. The motor drive circuit 36, in response to each step command, operates to energize the motor 20 over cable 38 precisely as in the recording mode. The motor then provides a single incremental tape step exactly equal to a tape step performed during a recording operation.

The control circuit 30 inhibits the read circuit 22 during the initial period of a motor step. When the tape 12 reaches its maximum velocity of travel, the control circuit 30 enables the read circuit 22 to read the short segment of tape then passing the head unit 14. Since all information characters were previously recorded on the tape during the period of maximum tape velocity in each tape step, the segment of tape passing the head unit 14 during the period of maximum tape velocity in each tape step on playback contains a recorded information character. The use of physically sprocketed magnetic tape permits the establishment of a predetermined relationship between the position of the sprocket holes and the location of the bits of each character recorded on the tape 12, while the sprocket holes serve to maintain the necessary registration between the location of the recorded character bits and the head unit 14 at maximum tape velocity.

The character bit sensed by each magnetic head of head unit 14 is temporarily stored in the read circuit 22 for ultimate transmission to the data receiver 24 as particularly discolsed in my above noted copending application.

*Stepping motor operation*

Figure 2:
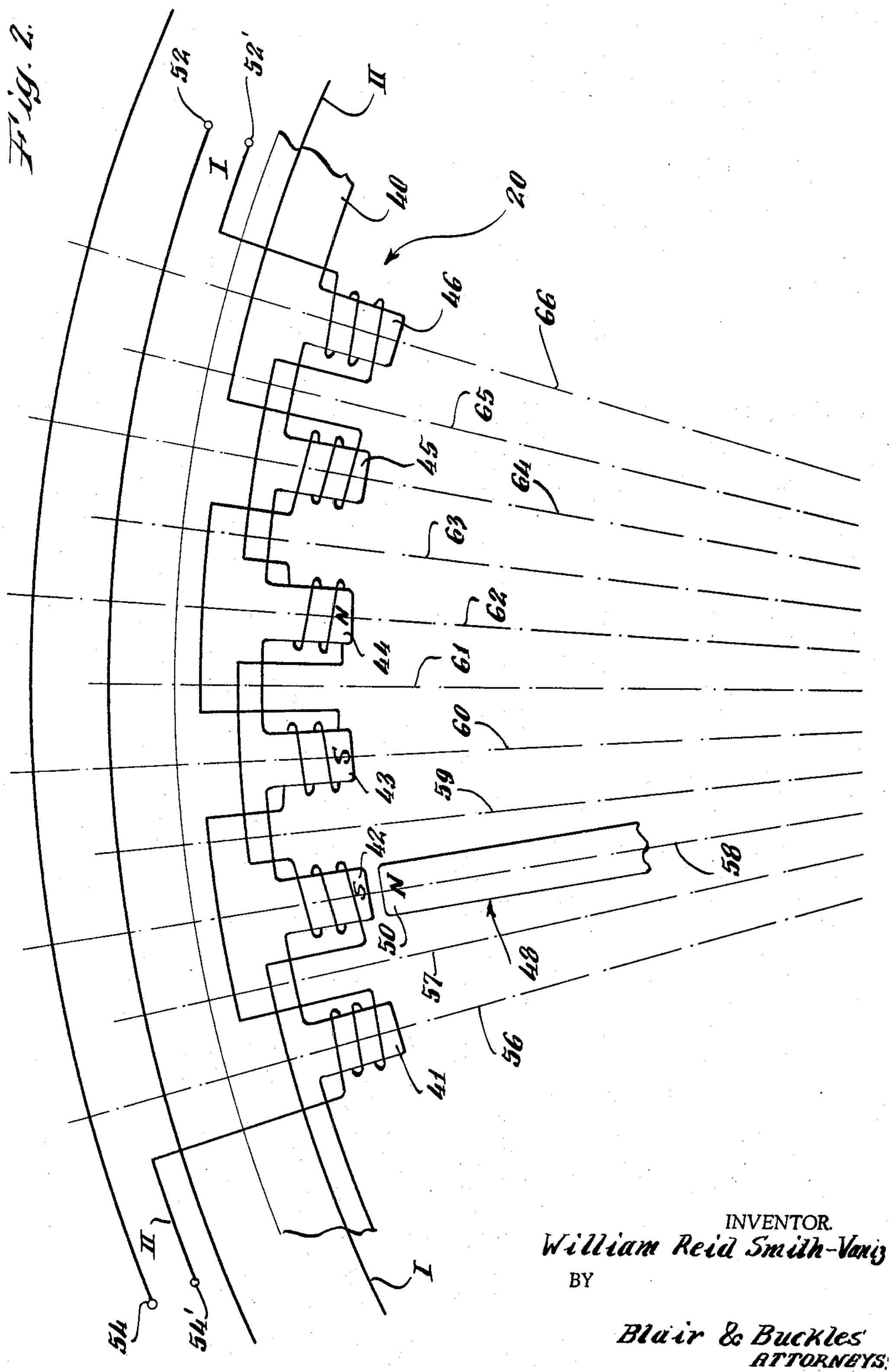
FIGURE 2 is a generalized schematic diagram of a preferred form of stepping motor used in the tape transport of FIGURE 1.

For an understanding of the principles of operation of the present invention as applied to the preferred form of stepping motor 20, reference should be had to FIGURE 2. Generally, the motor 20 comprises a stator 40 having a plurality of uniformly and circumferentially spaced field poles, of which only field poles 41 through 46 are shown. Every other field pole is wound with a first field winding I, and every other field pole wound with winding I is wound in an opposing winding sense. The remaining field poles are wound in corresponding manner with a second field winding II. Thus, in the fragmentary showing of FIGURE 2, field poles 41, 43 and 45 are wound with field winding II, with field pole 43 wound in the opposite sense from poles 41 and 45. Similarly, field winding I is wound in about field poles 42 and 46 in one direction, and about field pole 44 in the opposite direction.

It should be understood that each field pole 41–46 is paired with a diametrical field pole wound with the same field winding, but in an opposite winding sense. Thus, for example, the field pole positioned on the same diameter as field pole 41 is also wound with field winding II but in the opposite winding sense.

With this winding convention, D.C. energization of field winding II in one direction produces a magnetic pole condition where, for example, field poles 41 and 45 are north N poles, and field pole 43 is a south S pole. The diametrically opposed field poles paired with field poles 41, 43 and 45 then become S, N and S poles, respectively. Reversing the direction of D.C. current in field winding II serves to produce the magnetic pole condition S, N and S for field poles 41, 43 and 45, respectively. Similarly, selective D.C. energization of field winding I controls the magnetic pole condition for field poles 42, 44 and 46, as well as those diametrically opposed thereto.

The establishment of a particular magnetic pole condition for the field poles of motor 20 creates a magnetic detent position holding a permanent magnet rotor 48 in a specific angular orientation. Appropriate modification of this magnetic pole condition causes the rotor 48 to step to a new magnetic detent position. For the purpose of the description to follow the end portion 50 of the permanently magnetized rotor shown in FIGURE 2 is assumed to provide a north N magnetic pole condition. The opposite end portion, not shown, of the rotor will then constitute a south S magnetic pole. It is to be understood that the showing of FIGURE 2 is quite generalized for, in practice, the rotor 48 may have a plurality of spaced permanently magnetized pole elements magnetically attracted by the circumferential array of field poles.

If, for example, winding I is energized from a D.C. source connected across terminals 52–52′ such that field pole 42 provides a south S magnetic pole, the rotor 48, with its end portion 50 constituting a north N magnetic pole, is attracted and held in alignment with the radial line 58, which is the center line of field pole 42 and its paired diametrically opposed field pole, not shown. This diametrically opposed field pole, which becomes a north N magnetic pole, likewise attracts and holds the opposite end, not shown, of rotor 48 which is a south S magnetic pole. In the description to follow, reference to the field poles diametrically opposed to field poles 41–46, and the opposite end of rotor 48 from end 50 will be omitted since their magnetic pole conditions are always the complement of the magnetic pole conditions for field poles 41–46 and the end 50 of rotor 48.

As long as field winding I remains energized and field winding II is de-energized the rotor 48 will be held in alignment with the radial line 58 which corresponds to one magnetic detent position. If a D.C. source is connected across terminals 54–54′ of field winding II, such that field pole 43 then becomes a south S magnetic pole, the rotor is stepped into alignment with the radial line 59, corresponding to the mid-point between field poles 42 and 43, when winding I remains energized as before. If energization of winding I is terminated when winding II is energized, the rotor will step into alignment with radial line 60 corresponding to the center line of field pole 43.

To continue stepping the rotor in the clockwise direction, winding I is energized in the opposite direction from before to make field pole 44 a south S magnetic pole. It will thus be seen that the D.C. current in field windings I and II is selectively changed in direction to advance the south S magnetic pole condition to successive field poles whereby the rotor 48 is stepped into alignment with successive detent positions, 61–66 as shown in FIGURE 2.

Returning to the situation where rotor 48 is aligned with field pole 42 and magnetic detent position 58, if winding II is energized in a direction such that field pole 41 rather than field pole 43 becomes a south S magnetic pole, the rotor 48 will step in the counter-clockwise direction to align with radial ilne 57 when winding I remains energized or radial line 56 when winding I is de-energized. It will thus be seen that the rotor 48 may be stepped in either direction depending on the sequence and direction in which the windings I and II are selectively energized.

Figure 3:
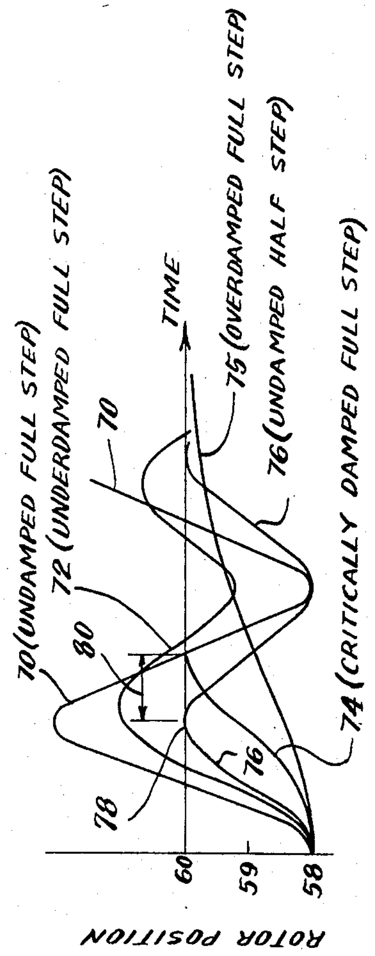
FIGURE 3 is a graph of shaft position versus time for the stepping motor of FIGURE 2 when driven according to prior techniques and when driven according to the method of the present invention.

Various velocity curves for the rotor 48 are shown in FIGURE 3. Curve 70 depicts the undamped translation of rotor 48 from the magnetic detent position 58 to the detent position 60 as seen in FIGURE 2. It is noted that the rotor 48 due to its inertia, and with the ideal condition of no losses continues to oscillate clockwise and then counter-clockwise about the detent position 60 under the magnetic attraction of a south S magnetic pole at field pole 43.

Curve 72 depicts the under-damped motion versus time of rotor 48 in stepping from detent position 58 to detent position 60. Rotational oscillations of the rotor 48 continue, but at progressive decaying amplitudes due to the inherent damping of the motor 20 until the rotor 48 eventually comes to rest at detent position 60.

Curve 74 of FIGURE 3 depicts the motion of the rotor from detent position 58 to 60 under critical damping conditions such as provided by special viscous damping provisions, electrical energy dissipating elements and the like. Although rotational oscillations are eliminated, it is to be noted from the slope of curve 74 that the angular velocity of the rotor 48 is severely limited in comparison to the angular velocity of the rotor 48 represented by curves 70 and 72. The overdamped velocity curve for rotor 48 is represented at 75. With this condition, the rotor 48 requires considerable time to reach detent position 60.

Curve 76 corresponds to the undamped motion of rotor 48 in stepping from detent position 58 to detent position 59, when both windings I and II are energized to establish south S magnetic pole conditions at both field poles 42 and 43. It is noted that the rotor 48, in overshooting detent position 59, reaches detent position 60 before reversing its rotational direction to return to detent position 59 when all but inherent damping of the motor 20 is eliminated.

According to the present invention, both field windings I and II are energized to establish south S magnetic pole conditions at both field poles 42 and 43. With motor damping held to a minimum, the motion of the rotor 48 closely approximates curve 76. It will be appreciated that due to unavoidable electrical and mechanical energy losses, there will necessarily be some inherent damping present. Rather precisely at the instant the rotor 48 reaches zero angular velocity at a point adjacent detent position 60, indicated at 78 in FIGURE 3, the D.C. current in winding I is terminated. As a consequence, rotor 48 is held at detent position 60. Since the rotor 48 is substantially stationary at a position substantially aligned with detent position 60 at the instant winding I is de-energized, only negligible oscillations will occur as the rotor "homes in" on the detent position 60.

Each step of the rotor 48 whether in the clockwise or counter-clockwise direction, is thus executed by appropriate energization of both field windings I and II as a half-step command and, upon completion of the first half period of rotor oscillation, one of the field windings is de-energized to provide an additional half-step command precisely when the rotor is substantially in the full step position. Comparing curves 74 and 76 of FIGURE 3, it is seen that the rotor reaches the full step position (magnetic detent position 60), substantially earlier in time as represented by the time interval 80, utilizing the present invention rather than prior damping techniques.

*Motor drive*

A step command in the form of a positive pulse generated by the data transmitter-receiver 24 of FIGURE 1 is applied to the input terminal 82 of the motor drive circuit 36, shown in detail in FIGURE 4. This positive step command pulse is applied as a triggering input to a delay multivibrator 84 (FIGURE 4). The delay multivibrator 84, when triggered, provides a positive-going output on line 84*a*, and a negative-going output on line 84*b*, with each of these output signals having an equal and constant time duration. The positive-going trailing edge of the output signal on line 84*b*, occurring when the delay multivibrator 84 returns to its stable state after having been triggered by a step command pulse, is differentiated by a series connected capacitor C1 and diode D1 to produce a positive-going pulse for triggering a delay multivibrator 86. The resulting output signals from delay multivibrator 86 are a positive-going output on line 86*a* and a complementary negative-going output on line 86*b*.

The positive-going output signals from delay multivibrators 84 and 86 on lines 84*a* and 86*a*, respectively, are applied as inputs to a positive OR gate 88. In addition, the positive-going output signal on line 84*a* is applied through a diode D2 to cut off delay multivibrator 86, and thereby terminate the output signals on lines 86*a* and 86*b*. In practice, the positive signal on line 84*a* may be applied through diode D2 to the collector of the normally conducting PNP transistor of a cross-coupled transistor pair making up a conventional delay multivibrator. The application of a positive voltage level to the collector of the normally conducting transistor returns this transistor to its conducting state, thereby terminating the positive-going and negative-going multivibrator output signals.

The operation of the motor drive circuit 36, thus far described, is such that a positive step command pulse appearing at input terminal 82 triggers delay multivibrator 84 to its unstable state. The resulting positive-going output on line 84*a*, having a predetermined time duration established by adjustment of the delay multivibrator 84, produces a positive signal on line 88*a* at the output of the OR 88. At the instant when the positive-going output on line 84*a* terminates, the negative-going output signal on line 84*b* also terminates in a positive-going trailing edge which is effective to trigger delay multivibrator 86 to its unstable state. The termination of the positive-going signal on line 84*a* coincides in time with the initiation of the positive-going output signal on line 86*a*, so that the positive output signal on line 88*a* from OR gate 88 remains positive as long as either the delay multivibrator 84 or delay multivibrator 86 is in its unstable state.

Through appropriate internal adjustments of delay multivibrators 84 and 86, the positive-going output signal on line 88*a* is designed to have a time duration equal to the time required for the rotor 48 to complete the first half-cycle of oscillation in response to a half-step command as described above in connection with FIGURES 2 and 3. This time duration thus equals the time required for the rotor 48 to step to the next full step detent position.

The positive step command pulses appearing at input terminal 82 of the motor drive circuit 36 are also applied to one input of a positive AND gate 90. The other input to AND gate 90 is derived from a direction control signal applied at terminal 92. This direction control signal at terminal 92 is also inverted in an inverter circuit 94 for application as one input to a positive AND gate 96. The positive-going trailing edge of the output signal from delay multivibrator 86 on line 86*b* is differentiated in series connected capacitor C2 and diode D3 to provide a positive pulse for application to the second input of AND gate 96. The output from AND gate 90 is fed to a forward input F of a reversible "Gray scale" counter 98. The output from AND gate 96 is fed to reverse input $\overline{F}$ of the counter 98.

It will thus be seen that if the direction control signal at terminal 92 is at a positive voltage level, AND gate 90 is enabled and a positive step command pulse is passed through to the input F, causing the counter 98 to count up one count in the forward direction. A positive direction signal inverted in inverter 94 disables AND gate 96. On the other hand, with the control signal at terminal 92 at a negative voltage level, AND gate 90 is disabled, whereas, by virtue of the inverter 94, AND gate 96 is enabled. Accordingly, a positive pulse occurring at the trailing edge of the negative-going output signal on line 86*b* is passed through to the input $\overline{F}$ of counter 98 causing the counter to count down one count in the reverse direction.

Figure 5:
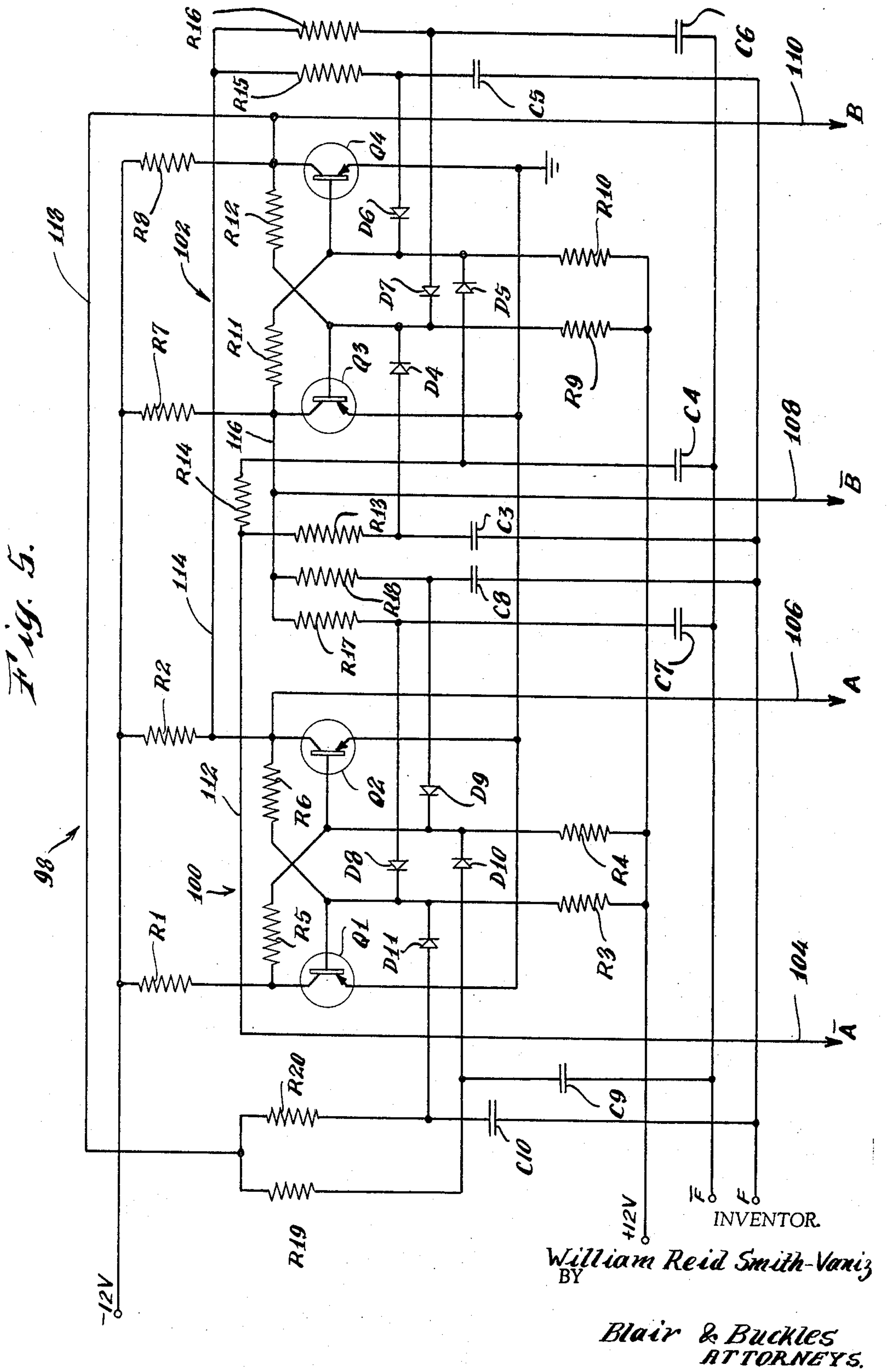
FIGURE 5 is a schematic wiring diagram of the reversible "Gray scale" counter shown in FIGURE 4.

The Gray scale counter 98 disclosed in detail in FIGURE 5 is comprised of two bistable stages or flip-flops 100 and 102. Flip-flop 100 includes a pair of cross-couple transistors Q1 and Q2, while flip-flop 102 includes a similarly cross-coupled transistor pair Q3 and Q4.

The collectors of transistors of Q1 and Q2 are connected to a negative 12 volt supply through resistors R1 and R2, respectively, while their emitters are tied directly to ground. The bases of transistors Q1 and Q2 are respectively connected to a plus 12 volt supply through resistors R3 and R4. In conventional fashion, the collector of transistor Q1 is cross-coupled to the base of transistor Q2 through a resistor R5, while the collector of transistor Q2 is similarly cross-coupled to the base of transistor Q1 through a resistor R6.

In identical fashion, transistors Q3 and Q4 comprising flip-flop 102 are connected at their respective collectors to the negative voltage supply through resistors R7 and R8, and at their respective bases to the positive voltage supply through resistors R9 and R10, while their emitters are tied to ground. The collector of transistor Q3 is cross-coupled to the base of transistor Q4 through resistor R11, and the collector of transistor Q4 is connected to the base of transistor Q3 through the resistor R12.

To briefly review the operation of a flip-flop, it will be assumed that the transistor Q1 of flip-flop 100 is conducting. As a consequence, the ground potential on the emitter of transistor Q1 is conducted through to its collector, which is connected to an output line 104. With the collector transistor Q1 held at ground potential, the base of transistor Q2 is biased positively relative to its emitter to hold this transistor cut off. Since transistor Q2 is nonconducting, its collector is maintained at a negative potential by virtue of the potential divider including resistors R2, R6 and R3 connected between the positive voltage supply and the negative voltage supply. The junction between resistors R6 and R3 applies a negative bias to the base of transistor Q1 holding it in conduction. The collector of transistor Q2 is connected to an output line 106. It will thus be seen that in the condition where transistor Q1 is conducting and transistor Q2 is cut off, the output signal on line 104, designated $\overline{A}$, is positive relative to the output signal, designated A, on line 106.

To change the condition of output signals A, $\overline{A}$ developed by flip-flop 100, a positive pulse is applied to the base of transistor Q1. Transistor Q1 is then cut off and the potential at its collector goes negative. This, in turn, causes the base of transistor Q2 to go negative driving this transistor into conduction. The ground potential at the emitter of transistor Q2 is then communicated to its collector thereby raising the potential at the base of transistor Q1 to maintain it at cut off. It is thus seen that the flip-flop output signals A and $\overline{A}$ on lines 106 and 104, respectively, are the complement of their previous condition, i.e., the output signal $\overline{A}$ on line 104 is negative, while the output signal A on line 106 is positive relative thereto.

In identical fashion, the flip-flop 102 provides respectively positive and negative outputs, designated $\overline{B}$ and B, on output line 108 connected to the collector of transistor Q3 and output line 110 connected to the collector of transistor Q4, respectively.

In the description to follow, it will be seen that the signal levels of concern are either at a negative voltage level of approximately 8 volts or at ground potential. Accordingly, a negative potential level will be designated as a "negative" signal whereas a ground potential level will be designated a "positive" signal.

Still referring to FIGURE 5, positive pulses appearing at either input terminals F or $\overline{F}$ are selectively steered into the flip-flop stages 100 and 102 to cause the counter 98 to count up or down. As shown, a positive output signal $\overline{A}$ is applied over line 112 and through a resistor R13 to forward bias a diode D4 in order that positive pulses applied to the input terminal F are passed through a capacitor C3 and diode D4 to the base of transistor Q3. Similarly, the positive signal $\overline{A}$ on line 112 applied through resistor R14 forward biases a diode D5 such that positive pulses applied to input terminal $\overline{F}$ are passed through capacitor C4 and diode D5 to the base of transistor Q4. If, on the other hand, the output signal $\overline{A}$ on line 112 is negative, diodes D4 and D5 will be reversed biased to block the passage of positive pulses. It will thus be seen that the combination of resistor R13, capacitor C3, and diode D4, and the combination of resistor R14, capacitor C4, diode D5 comprise separate steer gates which pass positive pulses effective to alter the condition of flip-flop 102 when the output signal $\overline{A}$ on line 112 is positive or blocks the passage of positive pulses to this flip-flop if the output signal $\overline{A}$ is negative.

Operating in similar fashion, resistor R15, capacitor

C5, and diode D6 comprise still another steer gate for selectively steering positive pulses appearing at input terminal F to the base of transistor Q4 as controlled by the output signal A on line 114. The output signal A also controls the passage of positive pulses appearing at the input $\overline{F}$ to the base of transistor Q3 by a steer gate comprising resistor R16, capacitor C6 and diode D7.

The potential level of the output signal $\overline{B}$ appearing on line 116 controls the passage of positive pulses at input terminal $\overline{F}$ to the base of transistor Q1 by a steer gate comprised of resistor R17, capacitor C7 and diode D8. The potential of signal $\overline{B}$ on output line 116 also controls a steer gate comprised of resistor R18, capacitor C8, and diode D9 to steer positive pulses appearing at input F to the base of transistor Q2.

The output signal B appearing on line 118 connected from flip-flop 102 is effective in a similar manner to pass positive pulses appearing at input terminal $\overline{F}$ by way of a steer gate comprised of resistor R19, capacitor C9 and diode D10 to the base of transistor Q2. Finally, a steer gate consisting of resistor R20, capacitor C10 and diode D11 is controlled by the output signal B on line 118 to pass positive pulses appearing at input terminal F to the base of transistor Q1.

In describing a complete forward operating sequence of the Gray scale counter 98 of FIGURE 5, it will be assumed that the initial conditions are that the output signals $\overline{A}$ and $\overline{B}$ on lines 104 and 108 are positive, and therefore the output signals $\overline{A}$ and $\overline{B}$ on lines 106 and 110 are necessarily negative. It will further be assumed that the potential level of the direction control signal applied to terminal 92 of FIGURE 4 is positive, and therefore AND gate 90 is enabled to pass step command pulses to the F input terminal of the reversible Gray scale counter 98. The positive potential level inverter to a negative potential level by inverter circuit 94 disables the AND gate 96 and therefore no positive pulses are applied to the $\overline{F}$ input terminal to the counter 98. Accordingly, a positive step command pulse at terminal F is passed through capacitor C8 and diode D9 to the base transistor Q2. However, since transistor Q2 is already nonconducting (the output signal A on output line 106 being negative), a positive pulse at its base merely drives the transistor further into cut-off.

The positive pulse at terminal F is also passed through capacitor C3 and diode D4 to the base of transistor Q3 which is conducting (the output signal $\overline{B}$ on line 108 being positive). As a result, flip-flop B 102 is triggered to its other stable state such that the output signal $\overline{B}$ on line 108 is negative and the output signal B on line 110 goes positive. Since initially the output signals A and B were negative, diodes D6 and D11 are back biased, and consequently, the positive step command pulse is not passed to the base of either transistor Q1 or Q4.

It will thus be seen that, at the conclusion of the first step command pulse, the output signals $\overline{A}$ and B are positive while the output signals $\overline{A}$ and $\overline{B}$ are negative.

On application of the next positive step command pulse to terminal F of the counter 98, it will be seen that transistor Q1 is rendered nonconductive causing the output signal $\overline{A}$ on line 104 to go negative while the output signal A on line 106 goes positive. The condition of output signals B and $\overline{B}$ are unaffected by this second step command pulse. Accordingly, after the second step command pulse, output signals A and B are positive while output signals $\overline{A}$ and $\overline{B}$ are negative.

A third positive step command pulse passes through diode D6, and drives transistor Q4 to cut-off but does not change the condition of output signals A and $\overline{A}$. It will thus be seen that the output signals A and $\overline{B}$ are positive while output signals $\overline{A}$ and B are negative after the third step command pulse.

A fourth successive step command pulse is only effective to cut-off transistor Q2 through diode D9. Output signal A goes negative and output signal $\overline{A}$ goes positive. Output signal B and $\overline{B}$ remain negative and positive, respectively. It will thus be seen that at the conclusion of the fourth step command pulse, the Gray scale counter 98 has gone through a complete operating sequence where the condition of signals A, $\overline{A}$, B and $\overline{B}$ are identical to their signal conditions existing prior to the first step command pulse, as described above.

Figure 7:
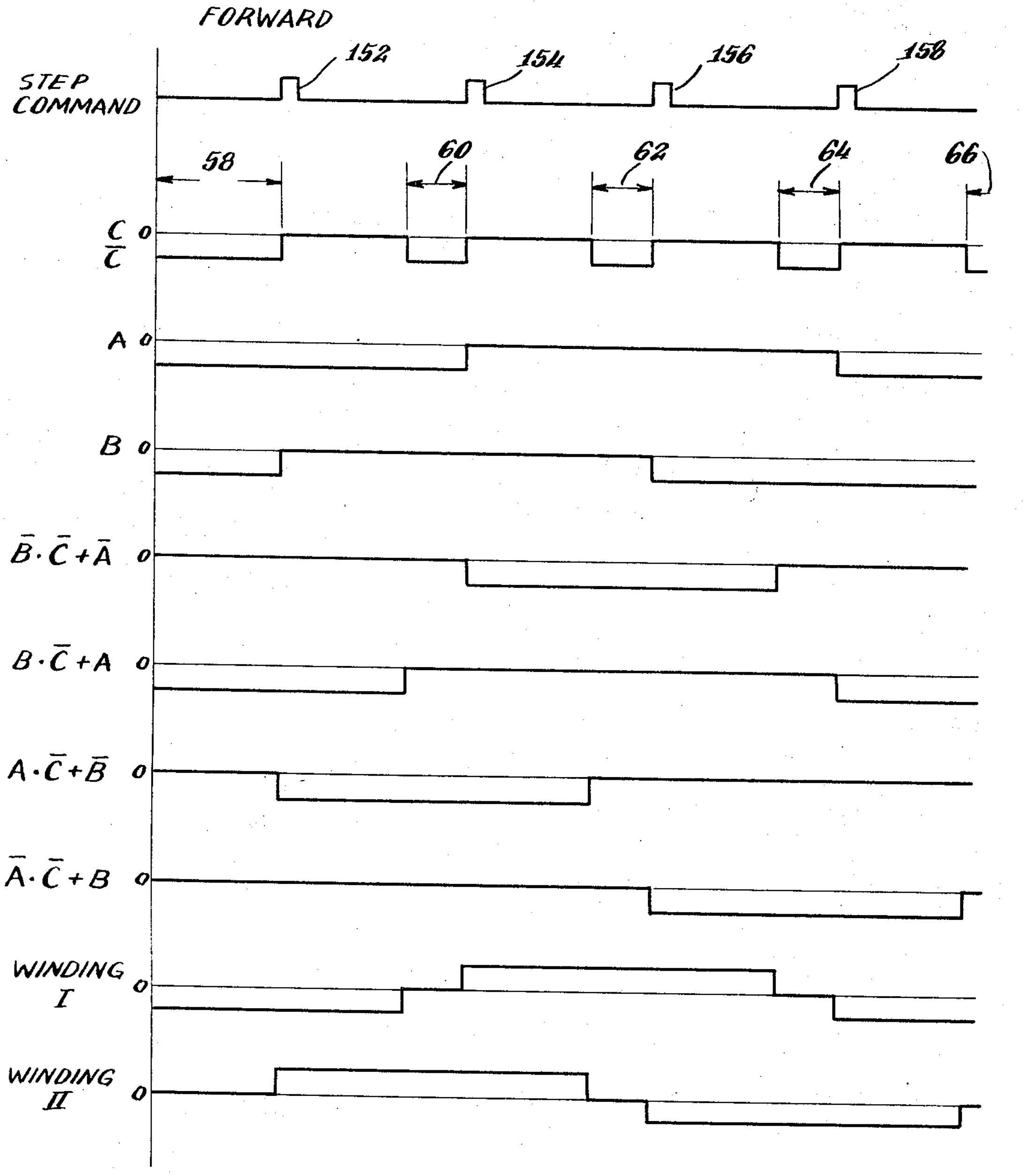
FIGURE 7 is a timing diagram showing the relationship of the various signals developed by the motor drive circuit of FIGURE 4 for stepping the motor of FIGURE 2 in the forward direction.

A complete forward operating sequence for the counter 98 is graphically illustrated in FIGURE 7. Since the potential levels of output signals $\overline{A}$ and $\overline{B}$ always complement the potential levels of output signals A and B, respectively, only the signal condition for output signals A and B are shown in FIGURE 7.

If, on the other hand, the direction control signal at terminal 92 of the motor drive circuit 36 of FIGURE 4 is negative, positive pulses are applied to the $\overline{F}$ input terminal of counter 98 from AND gate 96. The operative effect of pulsing the $\overline{F}$ input terminal rather than the F input terminal is to reverse the sequence of signal conditions for output signals A, $\overline{A}$, B and $\overline{B}$ as the counter 98 counts down rather than up one count for each positive pulse input. This output signal condition sequence is shown in FIGURE 8.

Returning to FIGURE 4, the positive output signal C from OR gate 88 on line 88A is applied as one input to each of four OR-INVERTER circuits 120, 122, 124 and 126. The second input to each of the OR-INVERTER circuits 120–126 is derived from the output signals $\overline{B}$, B, $\overline{A}$ and A, respectively as developed by Gray scale counter 98. Each of the OR-INVERTER circuits 120–126 corresponds in function to a negative AND gate whose output is inverted. Accordingly, if each of the inputs to an OR-INVERTER is at a negative voltage level, its output will be at positive voltage level. Conversely, if either of its inputs is at a positive potential level, its output will be at a negative potential level.

Considering OR-INVERTER 120, its output will be positive only when the positive output signal C on line *88a* at the output of OR gate 88 terminates (goes negative) and at the same time the output signal $\overline{B}$ on output line 108 from counter 98 is likewise negative. Recalling that signals B and $\overline{B}$ have complementary voltage levels a negative signal $\overline{B}$ requires that B be a positive signal. If the negative signal condition of line *88a* is expressed as $\overline{C}$, as contrasted to its positive signal condition which has been expressed as C, a positive output from OR-INVERTER 120 exists when there is a concurrence of the negative signal condition $\overline{C}$ and a positive output signal B from counter 98. This positive output condition from OR-INVERTER 120 can then be expressed in logical shorthand as $B\cdot C$. This positive output signal $B\cdot\overline{C}$ is applied to a positive OR gate 128 along with the output signal A appearing on line 106 connected from the counter 98. The output from the OR gate 128 can then be expressed in logical shorthand as $B\cdot\overline{C}+A$, which is a positive voltage level when either the output $B\cdot\overline{C}$ from OR-INVERTER 120 is a positive voltage level or the output signal A from the counter 98 is a positive voltage level.

Considering the positive output signals from OR-INVERTERS 122, 124, and 126 in the same fashion, they become in logical shorthand $\overline{B}\cdot\overline{C}$, $A\cdot\overline{C}$, and $\overline{A}\cdot\overline{C}$, respectively. The output $\overline{B}\cdot\overline{C}$ from OR-INVERTER 122 is supplied to an OR gate 130, which receives as its other input the output signal $\overline{A}$ appearing on line 104 connected from the counter 98. The output from OR gate 130 then becomes $B\cdot C+A$, which is applied along with the output $B\cdot\overline{C}+A$, from the OR gate 128 as control inputs to a switch bridge 132. The switch bridge 132 operates under the control of the respective potential levels of its inputs $B\cdot\overline{C}+A$ and $\overline{B}\cdot C+\overline{A}$ to selectively energize motor field winding I of the motor 20.

The output $A \cdot C$ from OR-INVERTER 124 is fed to an OR gate 134, along with the output signal $\overline{B}$ appearing on line 108 connected from the counter 98, to produce a control output expressed as $A \cdot \overline{C} + \overline{B}$. The output $\overline{A} \cdot \overline{C}$ from OR-INVERTER 126 is applied to an OR gate 136. The other input to the OR gate 136 is the output signal B appearing on line 110 connected from the counter 98. The output from OR gate 136, expressed as $\overline{A} \cdot \overline{C} + B$, and the output $A \cdot C + \overline{B}$ from OR gate 134 are applied as control inputs to a switch bridge 138, which is constructed in the same manner as switch-bridge 132. The switch bridge 138 operates under the control of the potential levels of these inputs from OR gates 134 and 136 to selectively energize motor field winding II of motor 20.

Figure 6:
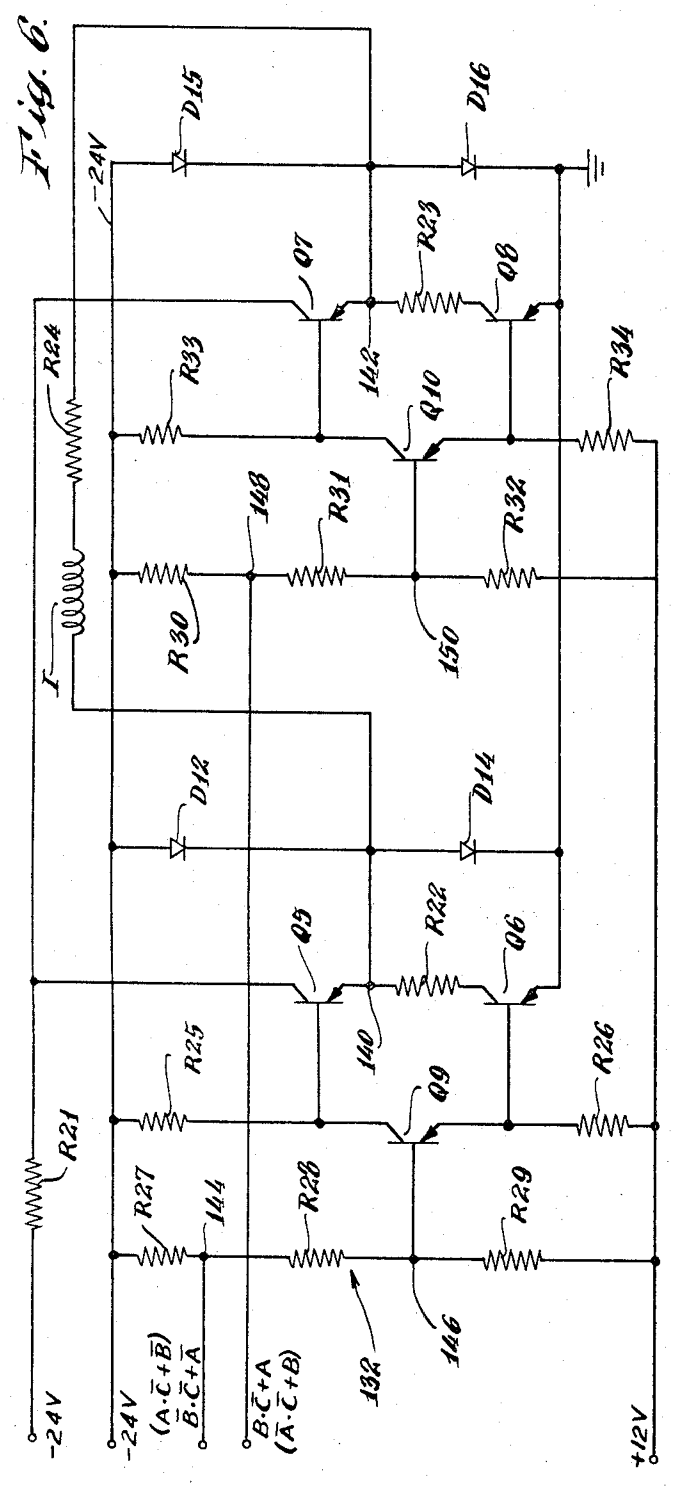
FIGURE 6 is a schematic wiring diagram of one of the switch bridges shown in FIGURE 4.

Since each of the switch bridges 132 and 138 is constructed in identical fashion only one, 132, is shown in FIGURE 6. The switch bridge 132 comprises transistors Q5, Q6, Q7, and Q8 connected in bridge fashion between a negative 24 volt supply and ground. Specifically, the collectors of transistors Q5 and Q7 are connected to the negative 24 volt supply through a resistor R21, while the emitters of transistors Q6 and Q8 are tied to ground. The collector of transistor Q6 is connected to the emitter of transistor Q5 through a resistor R22, and similarly, the collector of transistor Q8 is connected to the emitter of transistor Q7 through a transistor R23. The motor field winding I and a current limiting resistor R24 are connected in series across the bridge network between a junction 140, between resistor R22 and the emitter of transistor Q5, and a junction 142, between resistor R23 and the emitter of transistor Q7.

To selectively control current the conductive condition of transistors Q5 and Q6, a driver transistor Q9 has its collector connected through a resistor R25 to a negative 24 volt supply while its emitter is connected through resistor R26 to a positive 12 volt supply. The collector of transistor Q9 is tied directly to the base of transistor Q5, while the emitter of transistor Q9 is tied directly to the base of transistor Q6.

A potential divider comprising resistors R27, R28, and R29 is connected between the negative 24 volt supply and the positive 12 volt supply. The output $\overline{B} \cdot \overline{C} + \overline{A}$ from OR gate 130 of FIGURE 4 is applied to a junction 144 between resistors R27 and R28, while the junction 146 between resistors R28 and R29 is tied to the base of the resistor Q9.

A potential divider comprising resistors R30, R31, and R32 is also connected between the negative 24 volt supply and the positive 12 volt supply. The junction 148 between resistors R30 and R31 receives the output expressed as $B \cdot \overline{C} + A$ derived from the output of the OR gate 128 of FIGURE 4. The junction 150 between resistors R31 and R32 is tied directly to the base of a driver transistor Q10. The collector of transistor Q10 is connected through resistor R33 to the negative 24 volt supply, while its emitter is connected through resistor R34 to the positive 12 volt supply. The collector of transistor Q10 is also connected directly to the base of transistor Q7 while the emitter of transistor Q10 is connected directly to the base of transistor Q8.

A diode D12 is connected between the junction 140 and the negative 24 volt supply, and a diode D14 is connected between the junction 140 and ground. The junction 142 is connected to the negative 24 volt supply through a diode D15 and to ground through a diode D16. Diodes D12 through D16 are poled so as to protect transistors Q5 through Q8 from damage due to reverse voltage transients occasioned by the selective energization of motor winding I through operation of switch bridge 132. The switch bridge 132 of FIGURE 6 operates to determine the direction of D.C. current flow through the winding I as well as to terminate the flow of D.C. current therethrough depending upon the voltage levels of the control signals applied to junctions 144 and 148. Specifically, when the voltage level at junction 144 is negative, the resulting voltage at junction 146 is negative relative to the ground potential at the emitter of transistor Q9 causing this driver transistor to conduct. The resulting positive voltage rise on the collector of transistor Q9 turns transistor Q5 off. Conversely, the resulting negative going voltage at the emitter of transistor Q9 turns transistor Q6 on. Consequently, the junction 140 is coupled to ground through the resistor R22 and the collector-emitter circuit of transistor Q6.

For the condition when the input $B \cdot \overline{C} + A$ is positive (ground potential) at the junction 148, the junction 150 at the base of transistor Q10 goes positive driving this transistor toward cut-off. The collector of transistor Q10 than goes negative turning transistor Q7 on, while the emitter of transistor Q10 goes positive turning transistor Q8 off. Accordingly, with a negative potential level at junction 144 and a positive potential level at junction 148, D.C. current is permitted to flow from ground through the emitter-collector circuit of transistor Q6, resistor R22, junction 140, field winding I, resistor R24, junction 142, emitter-collector circuit of transistor Q7, and resistor R21 to the negative 24 volt supply.

Conversely, when junction 144 is at a positive voltage level and junction 148 is at a negative voltage level, transistors Q5 and Q8 are conducting, while transistors Q6 and Q7 are cutoff. Accordingly, D.C. current flows from ground through the emitter-collector circuit of transistor Q8, resistor R23, terminal 142, resistor R24, field winding I, junction 140, emitter-collector circuit of transistor Q5, resistor R21 to the negative 24 volt supply.

It will thus be seen that for the above-described two conditions, current flows in one case from junction 140 through field winding I to junction 142. Whereas in the other case D.C. current flows from junction 142 through the field winding I to junction 140. When the potential levels at junctions 144 and 148 are either both positive or both negative, it will be seen that D.C. current flow through field winding I is interrupted.

As above stated, the switch bridge 138 is constructed in the identical manner shown for switch bridge 132 in FIGURE 6. Accordingly, the field winding II is connected into the switch bridge 138 between the bridge junctions corresponding to the junctions 140 and 142 shown in FIGURE 6. Correspondingly, the output signal $A \cdot \overline{C} + \overline{B}$, derived from the output of OR gate 134 of FIGURE 4, is applied to the corresponding junction 144 in switch bridge 138. The output $A \cdot \overline{C} + \overline{B}$, derived from OR gate 136 of FIGURE 4, is applied to the junction of switch bridge 138 corresponding to the junction 148 of switch bridge 132 disclosed in FIGURE 6. The switch bridge 138 operates in the same manner as switch bridge 132, set out above, to selectively energize motor field winding II.

Turning to FIGURES 7 and 8 the timing relationship of the positive signal condition C and the negative signal condition $\overline{C}$ on line 88*a* at the output of OR gate 88 (FIGURE 4) relative to step command pulses is shown. It will be recalled that the signal condition C arises from the consecutive triggering of delay multivibrators 84 and 86 in response to a step command pulse. The time duration of the signal condition C is equal to the time required for the rotor 48 of motor 20 to complete the first half cycle of oscillation in response to a half-step command. The signal condition $\overline{C}$ on line 88*a* exists when the positive signal condition C is absent.

The expression $\overline{B} \cdot \overline{C} + \overline{A}$ for the output signal from the OR gate 130 of FIGURE 4 is plotted in FIGURE 7 for a complete cycle of output signal conditions when the counter 98 is consecutively pulsed on its F input terminal so as to count up or in the forward direction. As shown, the output signals A and B developed by the counter 98 are negative for the period prior to a first step command pulse indicated at 152. The output signals $\overline{A}$ and $\overline{B}$ from counter 98 are each at a positive level. The output signal $\overline{B}\cdot\overline{C}+\overline{A}$ will be at a postive level when either the signal $\overline{B}$ is at a positive level at the same time that the signal $\overline{C}$ exists (signal C nonexistent) or the signal $\overline{A}$ is positive. Since the output signal level $\overline{A}$ from the counter 98 is positive prior to the step comand pulse 152, the expression $\overline{B}\cdot\overline{C}+\overline{A}$ is also positive (ground potential) as shown in FIGURE 7. After the occurrence of step command pulse 152 the output signal $\overline{A}$ from the counter 98 remains at a positive level and, accordingly, the signal $\overline{B}\cdot\overline{C}+\overline{A}$ remains at a positive potential level. After step command pulse 152, the signal B from counter 98 is positive while signal $\overline{B}$ is negative. The next step command pulse 154 passed to the input terminal F of counter 98 (FIGURE 4) changes the output signal A from a negative level to a positive level. Therefore the signal $\overline{A}$ goes to a negative potential level. The output signal $\overline{B}$ from the counter 98 remains at a negative level. Accordingly, the output $\overline{B}\cdot\overline{C}+\overline{A}$ goes to a negative potential level as seen in FIGURE 7.

On the occurrence of the next consecutive step command pulse 156, the output signal $\overline{A}$ from counter 98 remains at a negative level whereas the signal $\overline{B}$ goes to a positive level. As a result, the output $\overline{B}\cdot\overline{C}+\overline{A}$ remains negative until the signal $\overline{C}$ comes into existence, at which time there is a concurrence of the signal $\overline{C}$ and a positive signal $\overline{B}$ causing the output $\overline{B}\cdot\overline{C}+\overline{A}$ to go to a positive potential level, as seen in FIGURE 7. As a result of a fourth step command pulse 158, the signals A and B from the counter 98 are both at a negative voltage level which corresponds to their signal condition prior to the first step command pulse 152, indicating that the counter 98 has gone through a complete cycle.

Using the same analysis as above for the output $\overline{B}\cdot\overline{C}+\overline{A}$, the outputs $B\cdot\overline{C}+A$, $A\cdot\overline{C}+\overline{B}$ and $\overline{A}\cdot\overline{C}+B$ can be plotted for the completed cycle of the counter 98, as shown in FIGURE 7.

As noted, the outputs $\overline{B}\cdot\overline{C}+\overline{A}$ and $B\cdot\overline{C}+A$ are applied to the respective junctions 144 and 148 of the switch bridge 132 shown in FIGURE 6. Correspondingly, the outputs $A\cdot\overline{C}+\overline{B}$ and $\overline{A}\cdot\overline{C}+B$ are applied to the junctions of the switch bridge 138 corresponding to the junctions 144 and 148 of the switch bridge 132.

With particular reference to FIGURE 6, D.C. current flows through motor field winding I from bridge junction 142 to bridge junction 140 for the period prior to the first step command pulse 152 since the output $\overline{B}\cdot\overline{C}+\overline{A}$ at junction 144 is positive and the output $B\cdot\overline{C}+A$ at junction 148 is negative. This direction of current flow from junction 142 to junction 140 of the switch bridge 132 is represented as a negative direction in FIGURE 7.

The outputs $A\cdot\overline{C}+\overline{B}$ and $\overline{A}\cdot\overline{C}+B$ applied to the junctions of switch bridge 138 corresponding to the junctions 144 and 148 of switch bridge 132 seen in FIGURE 6 are each at a positive level prior to the first step command pulse 152. Accordingly current flow through winding II is interrupted as seen in FIGURE 7.

The energization states of the motor field windings I and II established by the motor drive circuit 36 of FIGURE 4 in response to successive step command pulses 152 through 158 are shown in FIGURE 7.

In considering the operation of the motor 20 shown in FIGURE 2, it will be assumed that the rotor 48 is in the magnetic detent position 58, as shown, prior to the receipt of the first step command pulse 152 shown in FIGURE 7. Detent position 58 is also represented in FIGURE 7 by the time interval 58 to assist in correlating FIGURES 2, 7 and the description to follow. Detent positions 60, 62, 64 and 66 are similarly represented. Motor field winding I is continuously energized with D.C. current flowing in the negative direction while motor field winding II is completely de-energized. As long as this condition prevails, field pole 42, wound with field winding I, establishes a south S magnetic pole to hold the rotor 48 in the magnetic detent position 58, as shown in FIGURE 2.

On receipt of the first step command pulse 152 current flow through field winding I in the negative direction is continued while at the same time, D.C. current is caused to flow through field winding II in the positive direction from the bridge terminal 140 to terminal 142 of switch bridge 138.

The winding direction of field winding II about field pole 43 is such that D.C. current in the positive direction establishes a south S magnetic pole. Accordingly, the rotor 48 executes a half-step under the south S magnetic pole attraction of both field poles 42 and 43 seeking the magnetic detent position 59 midway therebetween. As the rotor 48 completes its first half cycle of oscillation about the magnetic detent position 59, its position, represented at point 78 in FIGURE 3, is in substantial alignment with magnetic detent position 60. Precisely at this instant of zero rotor velocity, the signal C terminates and field winding I is de-energized. Accordingly, the south S magnetic pole at field pole 42 terminates and the continuing south S magnetic pole at field pole 43 holds the rotor 48 at magnetic detent position 60.

Still referring to FIGURES 2 and 7, upon the next step command pulse 154, windings I and II are both energized with D.C. current flowing in the positive direction. Accordingly, field poles 43 and 44 are both south S magnetic poles causing the rotor 48 to execute a half-step. That is, it seeks detent position 61 but overshoots it and arrives with zero velocity at detent position 62 at the precise instant that signal C terminates. On terminaion of the signal C, field winding II is de-energized. As a result, the rotor 48 is held at detent position 62. Further rotor steps are effected in response to step command pulses 156 and 158 by energizing field windings I and II in the sequence shown in FIGURE 7 to step rotor 48 successively to detent positions 64 and 66. The conditions of the outputs of the motor drive circuit 36 after step command pulse 158 are identical to their conditions prior to step command pulse 152 and therefore, the sequence of energization conditions of windings I and II shown in FIGURE 7 is merely repeated with subsequently occurring step command pulses.

It should be noted that while the rotor 48 is being stepped in the clockwise direction as seen in FIGURE 2, the step command pulses at terminal 82 of the motor drive circuit 36 of FIGURE 4 are employed directly to step the counter 98 up one step in count. Accordingly, as sen in FIGURE 7 either output signals A and $\overline{A}$ or B and $\overline{B}$ from the counter 98 are changed in voltage level in response to step command pulse at terminal 82. On the other hand, if the counter 98 is pulsed at input F to step the counter down in count, thereby causing counterclockwise stepping rotation of the rotor 48 seen in FIGURE 2, the stepping pulses are generated by the positive-going trailing edge of the output from delay multivibrator 86 occurring on line **86*b*. This trailing edge of the output on line 86*b* coincides in time with the termination of the C signal on line 88*a* of FIGURE 4. As a result, the conditions of outputs A and $\overline{A}$ or B and $\overline{B}$ are altered simultaneously with the termination of the C signal on line 88*a*, i.e., the initiation of the signal $\overline{C}$, by pulses 160–163, shown in FIGURE 8 and applied to the $\overline{F}$ input terminal of counter 98** in the manner previously described.

In considering the operation of the motor drive circuit 36 of FIGURE 4 for stepping the rotor 48 in the counterclockwise or reverse direction, it will be assumed that the rotor is initially in detent position 66 aligned with the field pole 46 and is to be successively stepped to magnetic detent position 58 aligned with field pole 42, as seen in FIGURE 2. The sequence of output signal conditions and resulting field winding energization states is shown in FIGURE 8. A comparison of FIGURES 7 and 8 shows that the sequence of output signal conditions for the reverse direction is the reverse of that for the forward direction.

As seen in FIGURES 2 and 7, to step the rotor 48 from the magnetic detent position 64 to the detent position 66 energization of field winding II in the negative direction is continued while D.C. current is caused to flow in field winding I in the negative direction. Upon the termination of the signal C, energization of the field winding II is interrupted leaving the rotor 48 in detent position 66 aligned with the south S magnetic pole previously established at field pole 46.

In order for the rotor to retrace the step from the detent position 66 to detent position 64 both field windings I and II are energized in the negative direction. Generation of the signal C, resulting from a step command pulse at terminal 82 (FIGURE 4), produces a south S magnetic pole condition at field poles 46 and 45. It will be noted that the output signals A, $\overline{A}$, B and $\overline{B}$ are not altered in producing this initial half-step command. The signal C terminates to provide the step pulse 160 at input terminal $\overline{F}$ of counter 98. The counter 98 steps down one count effecting the second half-step command by interrupting the current flow through field winding I precisely when the rotor 48 has completed its first half-cycle of oscillation about the detent position 65 between field poles 45 and 46. This leaves field winding II energized in the negative direction to establish a south magnetic pole condition at field pole 45 holding rotor 48 aligned therewith at detent position 64.

Continued stepping of the rotor 48 in the reverse or counterclockwise direction is effected by the sequence of output signal conditions and motor field winding energization states shown in FIGURE 8.

The step command pulse rate represented in FIGURES 7 and 8 is sufficiently low that the rotor 48 is able to come to rest after one step command pulse before the next one occurs. That is, the interval between step command pulses is greater than the time required for the rotor 48 to complete the first half cycle of oscillation in response to the initial half-step command. Accordingly, both motor field windings I and II are initially energized to effect the first half step and then one of the field windings is turned off to complete the full step.

In the specific application to magnetic tape transports for incremental recorder-reproducers, I have been found that it is not necessary for the tape to have zero velocity at the instant of the next step command pulse in order to achieve the required physical relationship between the location of the character position on the tape 12 and the head unit 14 at the time of maximum tape velocity (FIGURE 1). The prime concern is to have a substantially constant time delay between a step command pulse and the point in time when the rotor 48 passes through the half-step magnetic detent position mid-way between adjacent field poles. Thus, satisfactory incremental recorder-reproducer operation has been achieved where the interval between step command pulses is somewhat less than the time required for the rotor to complete the first half cycle of oscillation in response to the initial half-step command.

In terms of motor drive circuit operation, this means that, at rapid step command rates, both motor field windings I and II are always energized. Specifically, the signal C on the line 88a from OR gate 88 (FIGURE 4) will always be present and consequently the de-energization of one field winding normally occasioned by the termination of the signal C does not occur. According, the rotor 48 is then stepped by full-step commands seeking successive magnetic detent positions disposed midway between field poles.

Inasmuch as the signal C is always present for rapid step command rates, it will be noted that the rotor will not come to rest after each step command pulse. Although the rotor 48 is not at rest when the next step command pulse occurs, the requisite constant time delay between the next step command pulse and the passage of the rotor 48 through the next half-step position is substantially maintained. This is due to the fact that, although the rotor 48 has some initial velocity when the step command pulse occurs, it has not reached the full step position and thus will have farther to travel to the next half-step position. The upper limit to the step command rate is reached when this requisite time delay can no longer be maintained.

When the rotor 48 is being stepped in the clockwise or forward direction, it will be recalled that the counter 98 is stepped up one count by a step command pulse passed to the F input terminal of the counter. For counterclockwise stepping of the rotor 48, the counter 98 is pulsed on its $\overline{F}$ input terminal to step the counter down one count. The pulses applied to the $\overline{F}$ input terminal of the counter 98 are derived from the trailing edge of the output signal from multivibrator 86 on line 86b. At high step command pulse rates it becomes necessary for uniform bidirectional motor operation to pulse the counter 98 at its input terminal $\overline{F}$ when the next step command pulse is applied to the input terminal 82 of the motor drive circuit 36 (FIGURE 4) rather than wait for the multivibrator 46 to complete its natural cycle thereby providing the requisite positive-going trailing edge of the output on line 86b. Accordingly, if the multivibrator 86 has not completed its natural cycle when the next step command pulse appears at input terminal 82, the resulting positive-going signal on output line 84a of the multivibrator 84, as applied through diode D2, immediately terminates the operating cycle of multivibrator 86 as seen in FIGURE 4. This premature termination provides the trailing signal edge for pulsing the counter 98. Thus the counter 98 steps down another count to provide the next backward step command. The drive circuit 36 is thus capable of driving the motor 20 in either direction at maximum stepping rates up to 400 steps per second, for example.

Referring to FIGURE 4, at high step command rates a step command pulse will appear at input terminal 82 before multivibrator 86 has completed its cycle to terminate the positive-going signal *s* on line 86a developed in response to the last step command pulse. A second step command will nevertheless be performed since delay multivibrator 84 had previously returned to its stable state and thus is in condition to be triggered. Thus, the use of two delay multivibrators, 84 and 86, rather than a single delay multivibrator to generate the positive signal appearing on output line 88a of the OR gate 88 permits the motor drive circuit 36 to handle much higher step command pulse rates. It will be seen that if a single delay multivibrator is used, a step command pulse occurring before the termination of the multivibrator cycle will be ineffective to trigger the multivibrator into a second cycle of operation.

It should be pointed out however that, when switching from one direction of motor operation to the other, the rotor 48 must have zero velocity before the direction is changed. In other words, the signal C on line 88a of FIGURE 4 must have terminated before the voltage level of the direction control signal at terminal 92 is changed and the next occurrence of a step command pulse at terminal 82. The reason for this limitation can be seen from FIGURES 7 and 8. In the situation where the rotor 48 is being stepped in the clockwise direction from the position aligned with field pole 43 into alignment with field pole 44 as seen in FIGURE 7, if the direction control signal at terminal 92 is changed to a negative level before the natural termination of the signal C on line 88a, the counter 98 is pulsed on its input terminal $\overline{F}$ at the termination of the signal C causing the counter to step down one count. The rotor 48 returns to the position 60 aligned with field pole 43 without the application of a step command pulse at input terminal 82. Since the signal C is absent during this backward step, only field winding II wound about field pole 43 is energized. Consequently the rotor 48 oscillates about the magnetic detent position 60 rather than the detent position 61 midway between field poles 43 and 44.

If the direction control signal is changed to a negative level and a step command pulse is given before the termination of the signal C on the execution of a clockwise rotor step, it will be seen that both field windings I and II will be energized to effectuate the magnetic detent position 59 midway between field poles 42 and 43. On termination of the signal C, the counter 98 is again pulsed on its $\overline{F}$ input and the rotor 48 is held in alignment with field pole 42.

It will thus be seen that the rotor 48 will take a backward step without a step command pulse if the direction control signal is changed prior to the conclusion of the previous rotor step. If a step command pulse is also given, the rotor 48 will back step two magnetic detent positions. This situation prevails whether the rotor is being stepped in the clockwise direction, as described above, or in the counterclockwise direction when the direction control signal level is changed.

*Summary*

The invention thus provides a novel tape transport for an incremental recorder-reproducer. The tape transport is operable on command to impart uniform incremental stepping translation to a tape storage medium. During each tape step advancing the tape to a new indexed position, a recording or reproducing operation is performed by the recorder-reproducer. Each tape step is performed rapidly and is concluded without oscillatory motion as the tape comes to rest at each new indexed position. Moreover the tape transport is readily reversible such that commanded step-by-step translation of the tape can be effected in either direction.

The novel stepping motor drive circuit 36 incorporated in the tape transport operates to systematically energize the motor field windings I and II (FIGURE 2) according to successive half-step commands so as to step a substantially undamped rotor 48 through full step increments while eliminating rotational oscillations of the rotor. As described, the motor field windings I and II are energized in combination to effect an initial half-step command. The rotor 48 steps to a half-step position. When the rotor 48 reaches this half-step position, it has reached its maximum velocity and therefore has maximum kinetic energy. Consequently, the rotor overshoots the half-step position and reaches zero velocity substantially at a full-step position. At this point, all of the kinetic energy of the rotor 48 has been transferred to the magnetic field established by the combined energization of field windings I and II.

One of the field windings is then de-energized to hold the rotor 48 at the full step position, and all of the energy stored in the magnetic field of the motor 20 is absorbed in the motor drive circuit 36 rather than transferred to the rotor. Thus, the rotor need not dissipate any energy and may be substantially frictionless and undamped. Accordingly it will attain its various detent positions in the least possible time for any predetermined magnetic field strengths. Furthermore, the rotor 48 and the tape storage medium mechanically coupled thereto arrive at the full-step positions without overshooting and oscillating about them.

The Gray scale counter 98 is stepped in response to each one of a succession of step commands to establish a predetermined sequence of energization conditions for the field windings I and II so as to step the rotor 48 through a corresponding succession of full-step, magnetic detent positions in either direction depending on the potential level of the direction control signal applied to the input terminal 92 of the motor drive circuit 36 of FIGURE 4.

Although it has been described that each full step, magnetic detent position is established by energization of only one of the field windings I and II it will be noted that such full-step positions for the rotor 48 could also be established by energization of both field windings to align the rotor in a detent position mid-way between adjacent field poles. The initial half-step command step is then established by deenergizing one of the field windings I and II. The rotor then executes its first half-cycle of oscillation about an adjacent detent position aligned with one of the motor field poles. According to the teaching of the invention, the previously deenergized field winding is energized in the opposite direction when the rotor 48 completes this initial half-cycle of oscillation. The rotor 48 is then held in the next adjacent full-step, magnetic detent position disposed midway between adjacent field poles.

It will be apparent to those skilled in the art that the invention can readily be applied to motors having more than two field windings. The present invention is not limited in application to the specific motor 20 herein disclosed, but can also be used with other types of polyphase electromotive actuators of both the rotary or linear type. Moreover, the drive circuit 36 could be readily adapted to use a binary counter rather than the Gray scale counter 98. The logic circuitry for developing the control inputs to the switch bridges 132 and 138 may be modified without departing from the principles of the invention.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A tape transport for imparting incremental stepping translation, on command, to a tape storage medium, said transport comprising, in combination:

(A) an actuator having
  (1) a substantially undamped driven member, and
  (2) field windings magnetically coupled to said driven member;

(B) a tape drive means drivingly connected to said driven member; and (C) a drive circuit connected in circuit with said field windings and responsive to a tape step command to produce incremental stepping motion of said tape drive means, said drive circuit comprising
  (1) switching means for selectively energizing said field windings to establish a series of spaced magnetic detent positions for said driven member and
  (2) a control network
    (a) normally energizing said windings to magnetically retain said driven member at a first one of said magnetic detent positions prior to a tape step command,
    (b) said control network responsive to a tape step command
      (i) to energize said windings so as to magnetically attract said driven member in a predetermined direction toward an intermediate position between said one magnetic detent position and the next adjacent detent position whereby said driven member overshoots said intermediary position and reaches zero velocity substantially at the next adjacent position, and said control network then
      (ii) energizing said windings so as to magnetically retain said driven member at said next adjacent detent position to conclude an increment of motion of said tape drive means.

2. The tape transport defined in claim 1 wherein said control network comprises:

(c) sequentially operating means responsive to a succession of tape step commands for controlling said switching means to establish a logically ordered sequence of energization conditions for said windings so as to translate said tape medium through a corresponding succession of tape steps.

3. The tape transport defined in claim 2 wherein said sequentially operating means is an electronic counter providing a logically ordered sequence of control signals to said switching means.

4. The tape transport defined in claim 3 wherein said control network further comprises:

(d) direction control means for selectively reversing the sequence of control signals provided by said control network so as to selectively reverse the direction of tape medium translation.

5. A tape transport for imparting incremental stepping translation, on command, to a tape storage medium, said transport comprising, in combination:

(A) an actuator having
  (1) a driven member, and
  (2) means establishing a selectively varying magnetic field coupled to said driven member;

(B) a tape engaging member mechanically coupled to said driven member; and (C) a drive circuit response to a tape step command for controlling said actuator means to
  (1) establish a first half-step command for said member, and
  (2) add a second half-step command for said member when said member, upon execution of said first half-step command has substantially transferred all of its kinetic energy to said magnetic field,
  (3) whereby said energy may be absorbed by said drive circuit to conclude a full step increment of translation of said tape storage medium.

6. A drive circuit for producing incremental stepping operation, on command, of an electromotive actuator having a movable element and windings selectively energizable to establish a series of spaced magnetic detent positions for said element, said drive circuit comprising, in combination:

(A) switching means operating to establish selectively differing energization conditions of said windings; and (B) a control network responsve to a step command for controlling said switching means for
  (1) establishing a first energization condition of said windings to magnetically retain said element at a first one of said magnetic detent positions prior to a step command,
  (2) establishing a second energization condition of said windings so as to magnetically attract said element in a predetermined direction to an intermediary position between said one magnetic detent position and the next adjacent detent position in response to a step command, and
  (3) establishing a third different energization condition of said windings substantially when said element, in overshooting said intermediary position, reaches zero velocity at a point adjacent said next adjacent magnetic detent position so as to magnetically retain said element at said next adjacent detent position to await a subsequent step command.

7. A drive circuit for achieving incremental stepping of an electric motor having a magnetic rotor and at least two field windings selectively energizable to magnetically establish first and second series of uniformly circumferentially spaced stable rotor positions, individual stable rotor positions of said first series alternating with individual ones of said second series, said circuit comprising, in combination:

(A) first switching means connectable to a first one of said windings and selectively operating
  (1) to energize said first winding in a first sense,
  (2) to energize said first winding in a second sense, and
  (3) to de-energize said first winding;

(B) second switching means connectable to a second one of said windings and selectively operating
  (1) to energize said second winding in a first sense,
  (2) to energize said second winding in a second sense, and
  (3) to de-energize said second winding; and (C) a control network responsive to a step command and controlling the selective operation of said first and second switching means
  (1) to magnetically attract said rotor to one of said stable rotor positions of said first series prior to a step command,
  (2) to cause said rotor to rotate in a predetermined direction magnetically attracted by the next adjacent stable rotor position of said second series on receipt of a step command, and
  (3) to terminate the magnetic attraction of said next adjacent rotor position of said second series and establish the magnetic attraction for said next adjacent rotor position of said first series in said predetermined direction substantially when said rotor, in overshooting said next adjacent rotor position of said second series, approaches zero angular velocity at a point adjacent said next adjacent rotor position of said first series.

8. A drive circuit for stepping on command, an electric motor having a permanent magnet rotor and polyphase windings, selectively energizable to establish a plurality of uniformly, circumferentially spaced, stable rotor positions, said circuit comprising, in combination:

(A) first switching means operating to selectively energize a first one of said windings;

(B) second switching means operating to selectively energize a second one of said windings; and (C) a control network responsive to a step command for controlling said first and second switching means
  (1) to energize said first winding to hold said rotor at one stable position,
  (2) responsive to a step command to thereupon energize said second winding while continuing to energize said first winding to cause said rotor to rotate to the next adjacent stable rotor position, and
  (3) de-energizing said first winding substantially when said rotor reaches the second next adjacent stable rotor position.

9. A drive circuit for achieving incremental stepping of an electric motor having a rotor and polyphase windings, individually energizable to establish a plurality of first uniformly circumferentially spaced, stable rotor positions and simultaneously energizable to establish a plurality of second uniformly angularly spaced stable rotor positions alternating with said first stable rotor positions, said circuit comprising:

(A) first switching means operating to selectively energize a first one of said windings in one of two possible electrical directions;

(B) second switching means operating to selectively energize a second one of said windings in one of two possible electrical directions; and (C) a control network responsive to a step command for controlling said first and second switching means (1) to normally energize one of said first and second windings to hold said rotor at one of said first stable positions, (2) maintaining the energization of said one of said first and second windings while energizing the other of said first and second windings upon the occurrence of a step command to cause said rotor to rotate toward a next adjacent one of said second stable rotor positions, and (3) terminating the energization of said one of said first and second windings substantially when said rotor, in over-shooting said next adjacent second stable rotor position, reaches zero angular velocity near the next adjacent one of said first stable rotor positions (a) whereby said rotor is held in said next adjacent first rotor position as established by the sole energization of the other of said first and second windings.

10. A drive circuit for producing incremental stepping operation of an electrical motor having a movable element and a plurality of windings selectively energizable to establish a series of spaced magnetic detent positions for said element, said drive circuit comprising, in combination:

(A) switching means operating to establish selectively differing energization conditions of said windings;

(B) sequentially operating means responsive to a step command for developing control signals changing in response to each step command;

(C) means generating a timing signal in response to a step command; and (D) signal processing means for processing said control signals and said timing signals to derive control outputs for controlling the operation of said switching means, (1) said control outputs being effective to provide a first enerization condition for said windings to magnetically retain said movable element in one of said magnetic detent positions prior to a step command, (2) in response to a step command, said control outputs being effective to provide a second different energization condition of said windings, causing said element to move in a predetermined direction to an intermediary position between said one magnetic detent position and the next adjacent detent position, and (3) on termination of said timing signal, said control output being effective to provide a third energization condition of said windings substantially when said movable element, in overshooting said intermediary position, reaches zero velocity substantially at said next adjacent magnetic detent position.

11. The circuit defined in claim 10 wherein said sequentially operating means is an electronic counter, whereby the character of said control signals changes in a logically ordered sequence in response to each step command.

12. The circuit defined in claim 11 and:

(E) first gating means operating in response to a step command and to a first direction signal for effecting operation of said counter in a first direction, (F) second gating means responsive to the termination of said timing signal and a second direction signal for effecting operation of said counter in a second direction.

13. The circuit defined in claim 12 wherein said means generating a timing signal comprise:

(1) a first pulse generator, (2) a second pulse generator triggered by the termination of a pulse from said first pulse generator, and (3) summing means for combining the output of said first and second pulse generators to derive said timing signal.

14. The circuit defined in claim 13, wherein said means generating a timing signal further comprises:

(4) means interconnecting said first and second pulse generators to determine said second pulse generator on initiation of a pulse from said first pulse generator.

15. The circuit claimed in claim 14 wherein said switching means comprise:

(1) a first switching bridge connected to a first one of said windings and operating to (a) energize said one winding in one of two possible directions, and (b) terminate the energization of said one winding, and (2) a second switching bridge connected to another one of said windings and operating to (a) energize said other winding in one of two possible electrical directions, and (b) terminate energization of said other winding.

16. A tape transport, comprising in combination:

(A) tape drive means adapted for driving engagement with a tape;

(B) polyphase electromotive means comprising (1) at least two selectively energizable electromagnetic circuits for establishing preselected magnetic field detent positions, and (2) a movable element (a) selectively positionable at said detent positions in response to selective energization of said electromagnetic circuits and (b) directly connected to said tape drive means;

(C) said movable element and said tape drive means movable together substantially without friction or damping; and (D) means for selectively energizing said electromagnetic circuits (1) to normally hold said movable element at a first magnetic detent position, and (2) responsive to a tape step command (a) to establish at a predetermined instant in time, a second magnetic detent position toward which said movable element is attracted and would normally oscillate about at a predetermined natural frequency and (b) at a predetermined time after said predetermined instant, substantially equal to one half the natural period of oscillation of said movable element about said second detent position, establish a third magnetic detent position substantially at the position reached by said movable element after one half period of oscillation about said second magnetic detent position.

17. An electromotive actuator, comprising in combination:

(A) polyphase electromotive means comprising (1) at least two selectively energizable electromagnetic circuits for establishing spaced arrays of preselected magnetic field detent positions, and (2) a movable element (a) selectively positionable at said detent positions in response to selective energization of said electromagnetic circuits; and, (B) means for selectively energizing said electromagnetic circuits (1) to normally hold said movable element at a first magnetic detent position, and (2) responsive to a step command (a) to establish at a predetermined instant in time, a second magnetic detent position toward which said movable element is attracted and would normally oscillate about at a predetermined natural frequency and (b) at a predetermined time after said predetermined instant, substantially equal to one half the natural period of oscillation of said movable element about said second detent position, establishing a third magnetic detent position substantially at the position reached by said movable element after one half period of oscillation about said second magnetic detent position.

18. A drive circuit for polyphase electromotive means comprising:

(A) means for selectively energizing electromagnetic circuits of the electromotive means (1) to normally hold a movable element of the electromotive means at a first step position, and (2) responsive to a step command (a) to establish at a predetermined instant in time, a second step position toward which the movable element is attracted and would normally oscillate about at a predetermined natural frequency and (b) at a predetermined time after said predetermined instant, substantially equal to one half the natural period of oscillation of the movable element about said second step position, establishing a third step position substantially at the position reached by the movable element after one half period of oscillation about said second step position.

References Cited

UNITED STATES PATENTS

| | | | |
|---|---|---|---|
| 2,793,335 | 5/1957 | Woodruff | 318—18 |
| 3,051,883 | 8/1962 | Smith | 318—448 |

ORIS L. RADER, *Primary Examiner.*

G. SIMMONS, *Assistant Examiner.*